(12) United States Patent
Guern

(10) Patent No.: US 6,327,041 B1
(45) Date of Patent: Dec. 4, 2001

(54) METHOD AND DEVICE FOR OPTO-ELECTRICAL ACQUISITION OF SHAPES BY AXIAL ILLUMINATION

(75) Inventor: Yves Guern, Jouques (FR)

(73) Assignee: Dentalmatic Technologies, Inc., Quebec (CA)

( * ) Notice: Subject to any disclaimer, the term of this patent is extended or adjusted under 35 U.S.C. 154(b) by 0 days.

(21) Appl. No.: 09/722,045

(22) Filed: Nov. 27, 2000

Related U.S. Application Data

(63) Continuation of application No. PCT/FR99/01299, filed on Jun. 2, 1999.

(30) Foreign Application Priority Data

Jun. 5, 1998 (FR) .................................................. 98 07076

(51) Int. Cl.⁷ .................................................. G01B 11/00
(52) U.S. Cl. .......................... 356/601; 356/602; 356/608; 356/612; 356/127; 356/237.1; 250/559.22
(58) Field of Search .............................. 356/237.1–237.3, 356/239.1, 239.2, 239.3, 239.7, 394, 124, 127, 136, 372, 601, 608, 602, 604, 606, 609, 612, 620–624, 636; 250/339.11, 330, 341.8, 560, 559.22

(56) References Cited

U.S. PATENT DOCUMENTS

| | | | |
|---|---|---|---|
| 3,843,227 | * 10/1974 | Kato et al. | 356/606 |
| 4,585,349 | * 4/1986 | Gross et al. | 356/375 |
| 4,674,883 | * 6/1987 | Baurschmidt | 356/381 |
| 4,900,940 | * 2/1990 | Nakamura | 250/560 |
| 5,054,926 | * 10/1991 | Dabbs et al. | 356/376 |
| 5,165,063 | * 11/1992 | Strater et al. | 356/4 |
| 5,168,327 | * 12/1992 | Yamawaki | 356/376 |
| 5,606,174 | * 2/1997 | Yoshimura et al. | 356/608 |
| 5,608,529 | * 3/1997 | Hori | 356/376 |
| 5,701,173 | 12/1997 | Rioux . | |
| 5,745,236 | * 4/1998 | Haga | 356/237.1 |
| 5,880,846 | * 3/1999 | Hasman et al. | 356/375 |
| 5,889,276 | * 3/1999 | Yonezawa et al. | 356/376 |

FOREIGN PATENT DOCUMENTS 706027A 4/1996 (EP) .

OTHER PUBLICATIONS

Patent Abstracts of Japan, vol. 96, No. 1, Jan. 31, 1996.
JP 07.248211A (Toyota Central Research & Development Lab Inc.), Sep. 26, 1995.

* cited by examiner

Primary Examiner—Frank G. Font
Assistant Examiner—Sang H. Nguyen
(74) Attorney, Agent, or Firm—Lawrence E. Laubscher

(57) ABSTRACT

A method and a device for opto-electrically acquiring the shape of a surface by illuminating the surface (S) with light beams (10) having different wavelengths and which converge at different points on the axial illumination direction (Y) in the vicinity of the surface (S), by spectral analysis of the light reflected or backscattered by the surface (S) in the direction (Y) and by determining distances of points on the surface (S) relative to a reference plane (X, Y) from the wavelength and/or the spectral widths of the light analyzed.

10 Claims, 3 Drawing Sheets

METHOD AND DEVICE FOR OPTO-ELECTRICAL ACQUISITION OF SHAPES BY AXIAL ILLUMINATION

REFERENCE TO RELATED APPLICATION

This application is a continuation application of the PCT application No. PCT/FR 99/01299 filed Jun. 2, 1999, based on French Application No. 98-07076 filed Jun. 5, 1998.

BACKGROUND OF THE INVENTION

1. Field of the Invention

The invention relates to a method and a device for opto-electrical acquisition of shapes.

2. Brief Description of the Prior Art

A number of techniques for opto-electrical acquisition of shapes are known in the art:

- stereovision consists of deducing the relief of a surface by comparing images of the surface captured at two different angles at least; this method requires very large computing means, is limited to parts of the surface that are visible from both angles at the same time, and the location of edges is imprecise,
- observation of a surface by a video camera whose focussing is varied, which associates a distance (the focussing distance) with each clear area of an image of the surface; this system requires very large computing means, the measurement times are long and the spatial resolution is not very good,
- measuring the time taken by a light pulse to travel the distance between an emitter and the surface and between the surface and a receiver, or measuring the phase shift between modulated illumination projected onto the surface and the observed light backscattered by the surface; these means acquire points and must be associated with scanning means, which limits the acquisition speed,
- triangulation determines the length of the two sides of a triangle when two angles of the triangle and the length of the third side are known, and one application of triangulation consists of projecting a structured light flux onto the surface, using a video camera to observe the deformations of the flux by the surface and deducing therefrom, by triangulation, the distances of points on the surface relative to a reference plane; this technique suffers the limitations of triangulation (it requires the largest possible distance between the illumination means and the video camera and different illumination and observation directions), with the result that complex surface areas cannot be illuminated and observed simultaneously.

SUMMARY OF THE INVENTION

An object of the invention is a new technique for acquiring a three-dimensional shape by optical means which does not have the drawbacks of the prior art techniques referred to above.

Another object of the invention is a technique for acquiring a three-dimensional shape by optical means which combines accuracy, speed and the capacity to observe complex shapes without shadow areas.

The invention thus provides a method of opto-electrical acquisition of the shape of a surface, consisting of illuminating the surface, capturing the light reflected or backscattered by the surface in a given direction, analyzing it and deducing from it the distances of points of the surface relative to a reference plane, characterized in that it consists of illuminating said surface with a plurality of light beams having different wavelengths and which converge on an axial illumination direction at different points distributed along that direction, capturing the light reflected or backscattered by at least one point on said surface illuminated by at least one of the aforementioned beams, spectrally analyzing the light captured and deducing from its spectral composition the distance of the aforementioned point relative to the reference plane.

The invention therefore determines the distance of a point relative to a reference plane simply and quickly by determining the spectral width and/or the center wavelength of the light reflected or backscattered by that point.

The illumination wavelength can be varied continuously between two limit values, for example. It can instead be varied discontinuously and assume a number of predetermined values.

The illumination beams preferably converge onto the axial illumination direction at points which are distributed along that direction in the order of the wavelengths.

The light reflected or backscattered by said surface is advantageously captured in a direction which is approximately coincident with the axial illumination direction. The method according to the invention is then not limited by "shadow areas" of the observed surface.

The illumination beams can have a circular cross section for determining the distance of a point element or quasi-point element of the illuminated surface or can be flat light beams which intersect along parallel lines substantially perpendicular to the axial illumination direction for determining the distance of a profile of the illuminated surface defined by the intersection of the surface and a plane passing through the axial illumination direction and parallel to the lines of intersection of the flat light beams.

The invention also provides a device for acquiring the three-dimensional shape of a surface, this device including means for illuminating the surface, means for capturing the light reflected or backscattered by said surface in a given direction, and means for analyzing the captured light, associated with information processing means for determining the distances of points of the surface relative to a reference plane, characterized in that:

- the illumination means generate a plurality of light beams having different wavelengths and converging on an axial illumination direction at different points distributed along that direction,
- the means for analyzing the light reflected or backscattered by said surface include spectral analysis means, and
- the information processing means determine the distances of points of said surface from the spectral composition of the light analyzed.

To form the aforementioned light beams, the illumination means can include a polychromatic light source of particular spectral width, associated by means of a slit or a diaphragm with a dispersive element such as a prism, a grating or a holographic lens, for example, or the illumination means include a plurality of light sources of small spectral width and having different center wavelengths.

The spectral analysis means include a spectral dispersion element such as a prism or the like associated with photosensitive sensors in a linear or matrix arrangement.

The spectral analysis means include a triple linear strip of photodetectors for measuring and comparing light fluxes of three primary colors.

In a preferred embodiment of the invention, the spectral dispersion element of the illumination means is a chromatic lens whose focal length is varied continuously as a function of the wavelength and which is associated with an enlarging objective, for example an a focal objective, to increase the usable depth of field. The device further includes an objective for illuminating the surface with the aforementioned beams and capturing the light reflected or backscattered by that surface, the objective being associated with a mask or diaphragm including a circular orifice or a slit through which the light passes delimiting an observation area of the illuminated surface, and control means for relative displacement of the surface and the mask or diaphragm.

Generally speaking, the invention acquires a three-dimensional shape precisely, quickly and completely using relatively small computing means and relatively inexpensive optical means.

BRIEF DESCRIPTION OF THE DRAWING

The invention will be better understood and other features, details and advantages of the invention will become more clearly apparent on reading the following description, which is given by way of example and with reference to the accompanying drawings, in which.

DETAILED DESCRIPTION

Figure 1:
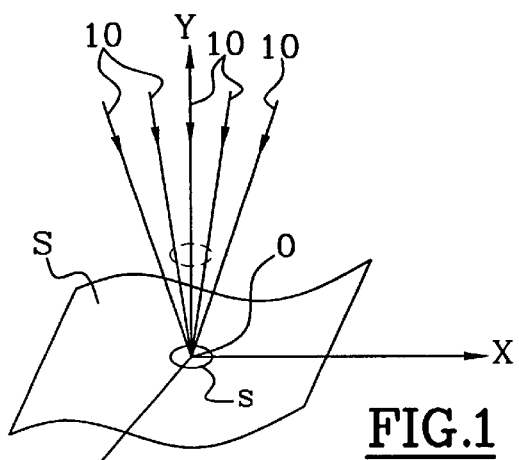
FIG. 1 is a diagram showing a first mode of illumination of a surface.

Referring to FIG. 1, a surface S is illuminated by several light beams 10 which are monochromatic or have a small spectral width, have different directions and different wavelengths, and converge at a common point O on or near the surface S, the point of convergence of the beams 10 forming a reference point for evaluating distances of points on the surface S in a fixed observation direction.

In the example shown, the reference point is in the plane XZ perpendicular to the axis Y, which is the observation direction and is coincident with the mean direction of illumination of the surface S.

The beams 10 are monochromatic and their wavelengths can be distributed continuously about a center wavelength which is that of the illumination beam 10 aligned with the axis Y.

If a unit surface s of the surface S is in the immediate vicinity of the point O on the axis Y it is illuminated by all of the beams 10 and reflects or backscatters all of the wavelengths of those beams. The light captured in the direction Y will therefore have a spectral width extending from the lowest to the highest wavelength of the beams 10, the spectral width being shown diagrammatically by the curve 12 in FIG. 2.

Figure 2:
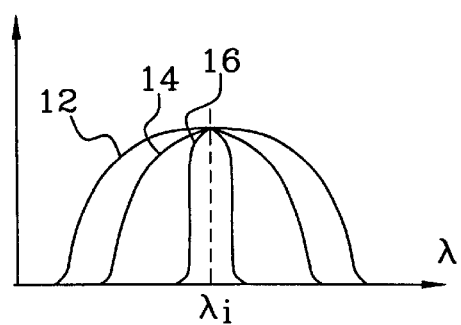
FIG. 2 is a graph showing variations of spectral width as a function of the distance along the Y axis of the light reflected or backscattered by the surface illuminated as in FIG. 1.

If the unit surface s of the surface S is on the axis Y in the position shown in dashed line in FIG. 1, it is no longer illuminated by all of the beams 10, but by some of them, and the light backscattered by the unit surface has the spectral width shown by the curve 14 in FIG. 2.

If the unit surface s of the surface S examined is even farther from the point O on the axis Y it is illuminated only by the beam 10 aligned with the axis Y and the backscattered light has a very narrow spectral width, shown diagrammatically by the curve 16 in FIG. 2, and centered on the wavelength $\lambda i$ of the beam 10 aligned with the axis Y.

The spectral width of the light backscattered by a unit surface therefore enables its position on the axis Y relative to the point O at which the illumination beams converge to be determined.

To prevent indeterminacy as to the position of the unit surface s on one side or the other of the point O on the axis Y, the method requires the point O to be maintained above or below the surface S under study.

Figure 3:
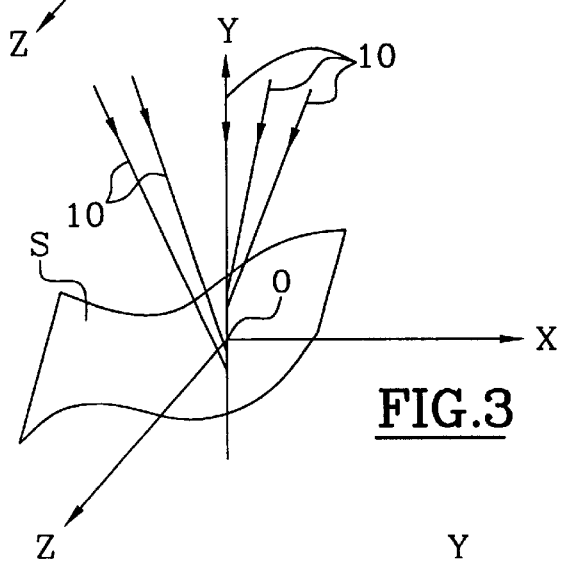
FIG. 3 is a diagram showing one mode of illumination of a surface in accordance with the invention.

The invention avoids this limitation by using the mode of illumination shown diagrammatically in FIG. 3, in which the various illumination beams 10 converge on the axis Y at different points, which are advantageously staggered along the axis in the order of the wavelengths of the illumination beams, but which could equally well be distributed along the axis in any predetermined order.

Figure 4:
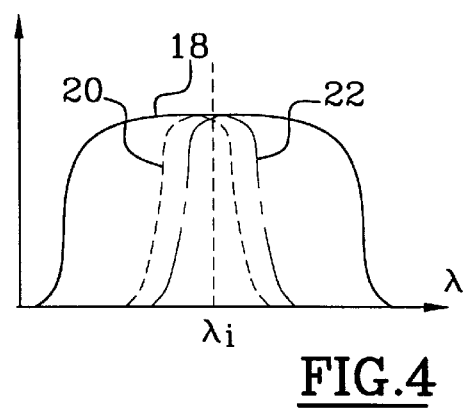
FIG. 4 is a graph showing diagrammatically variations of spectral width and center wavelength as a function of the distance along the Y axis of the light reflected or backscattered by the surface illuminated as in FIG. 3.

Accordingly, if $\lambda i$ denotes the wavelength of the illumination beam aligned on the axis Y, the position of a unit surface s of the surface S on the axis Y relative to the point O is determined by the center wavelength and by the spectral width of the light backscattered by that unit surface, as shown diagrammatically in FIG. 4:

if the light backscattered by the unit surface has the spectral width shown diagrammatically by the curve 18, it is at or in the immediate vicinity of the point O, or if the spectral width is that of the curve 20, the unit surface is above the point Q on the axis Y (when the shortest wavelength beams intersect the axis Y above the point O) and the distance to the point O is determined by the spectral width of the curve 20, or if the spectral width of the light backscattered by the unit surface corresponds to the curve 22, the unit surface is below the point O on the axis Y and the spectral width of the backscattered light determines its distance relative to the point O.

In practice, this staggering of the points of intersection of the various beams along the axis Y can be obtained very simply by using a lens whose chromatism has not been corrected, the chromatic lens focussing the various beams between points distributed along the axis in the order of the wavelengths.

Figure 5:
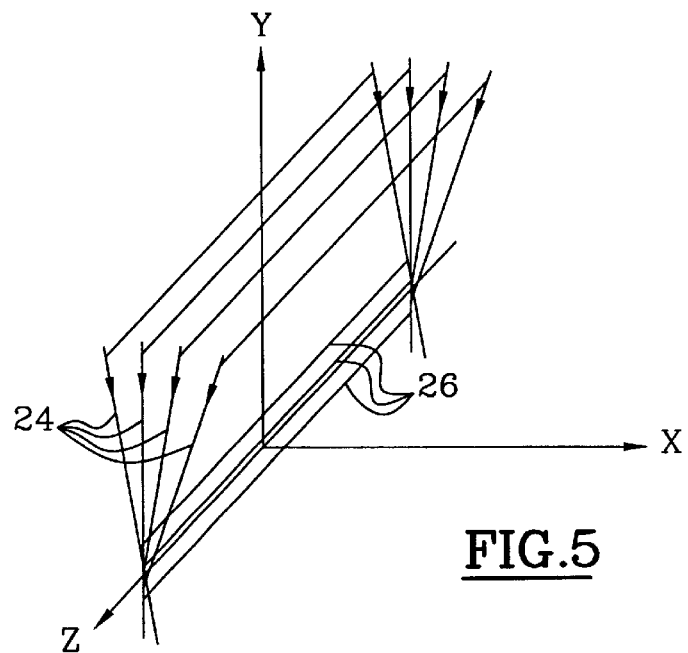
FIG. 5 is a diagram showing another mode of illuminating a surface in accordance with the invention.

Another embodiment uses the mode of illumination shown diagrammatically in FIG. 5 to acquire distances relative to the axis Z of points which constitute a profile of the observed surface S in the plane YZ, instead of the distance of a unit surface relative to the point O on the axis Y.

This embodiment uses flat light beams 24 which have different wavelengths and different orientations, one of which (including the center illumination wavelength, for example) passes through the axis Y and the axis Z and the others of which are parallel to the axis Z and intersect the flat beam along lines 26 parallel to the axis Z and staggered along the axis Y in the order of the illumination wavelengths.

By capturing light in the plane YZ which has been backscattered by the observed surface, it is possible to acquire a profile of points corresponding to the intersection of the observed surface S and the plane YZ, instead of a distance corresponding to the position of a unit surface on the axis Y. By moving this surface along the axis X, it is possible to acquire a plurality of profiles of the observed surfaces and to sample very quickly the coordinates of the points of that surface in the XYZ space.

Figure 6:
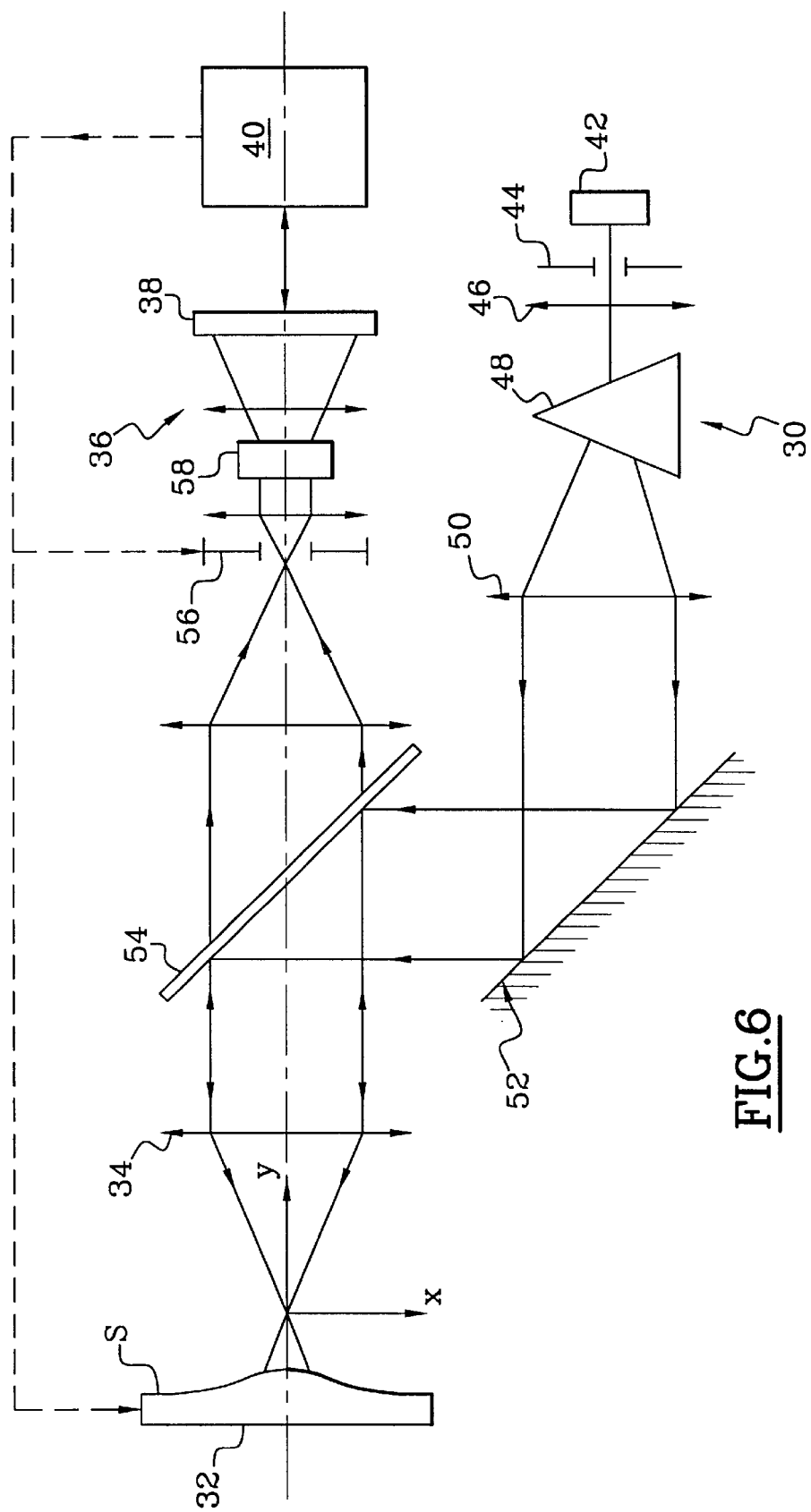
FIG. 6 is a diagram showing one embodiment of a device according to the invention.

FIG. 6 is a diagram showing a preferred embodiment of a device in accordance with the invention, which essentially includes means 30 for illuminating the surface S of an object 32, an objective 34 which causes the illumination to converge on the surface S, captures the light backscattered by the surface S and forms an image on spectral analysis means 36 including a dispersive element and appropriate photoreceptors 38, and means 40 for processing information controlling the photoreceptors 38 via an appropriate interface and supplying the distances of points on the surface S relative to a reference plane perpendicular to the common illumination and light capture axis Y.

In more detail, the illumination means 30 include a light source 42 generating a light beam of particular spectral width which is passed through a diaphragm or slit 44 and a lens 46 before reaching a spectral dispersion element 48 such as a prism, a grating or a holographic lens, for example.

The beam leaving the element 48 is passed through a collimator lens 50 and reflected by a mirror 52 onto a semi-reflecting plate 54 associated with the objective 34 and deflecting the illumination beam towards the surface S via the front lens of the objective 34.

The light backscattered by the surface S of the object 32 in the direction of the axis Y is captured by the objective 34 and transmitted to the spectral analysis means 36 via a diaphragm 56 or a mask pierced with an orifice or slit which forms an image of a unit or quasipoint surface of the surface S or of a profile of that surface on the spectral analysis means 36.

If the diaphragm 44 of the illumination means 30 forms an illumination beam of substantially circular cross section and the diaphragm or mask 56 includes a circular orifice through which the light passes, the dispersive element 58 of the spectral analysis means 36 shifts the light rays as a function of their wavelength in the direction of the axis X, perpendicular to the axis Y and in the plane of the drawing. The photoreceptor means 38 can consist of a linear strip of photodetectors parallel to the axis X so that the output signal of a photodetector in the strip corresponds to a particular wavelength. The output signals of the photodetectors 38, processed by the means 40, provide the spectral width and center wavelength of the light backscattered by a unit surface of the surface S of the object 32 directly, and therefore the distance of that unit surface relative to a reference plane perpendicular to the axis Y, subject to prior calibration of the device to produce calibration tables which are stored in memory in the information processing means 40.

The information processing means 40 can also be used to command relative movement of the surface S and/or the mask or diaphragm 56 in a plane perpendicular to the axis Y to observe all of the unit surfaces constituting the surface S.

In the example that has just been described, the light source 42 provides a continuous luminous spectrum whose spectral components are shifted continuously by the dispersive element 48 to form the light beams 10 previously referred to, which the front lenses of the objective 34 cause to converge on the axis Y in the vicinity of the surface S.

Alternatively, if the necessary number of light beams having different wavelengths and different directions is relatively small, the polychromatic light source 42 and the spectral dispersion means 48 can be replaced with several light sources which are substantially monochromatic or have a small spectral width and supply directly the beams at the different wavelengths.

In an embodiment providing the mode of illumination shown diagrammatically in FIG. 5, the diaphragm 44 includes a narrow slit whose length is perpendicular to the plane of the drawing and through which the light is passed and the diaphragm or mask 56 includes a narrow slit whose length is perpendicular to the plane of the drawing and through which the light is passed.

The photoreceptor means 38 then include a matrix of photodetectors arranged in rows and columns parallel to the axes X and Z, respectively (the axis Z is perpendicular to the plane of the drawing).

In this case the spectral analysis means 36 can be a slit imaging spectrometer associated with the matrix of photodetectors.

The photodetector means 38 can instead consist of a triple linear strip (of the TRICCD type, for example) for measuring and comparing luminous fluxes in three fundamental colors of the visible spectrum.

If the means 38 include a matrix of photodetectors in the plane ZX a set of luminous spectra can be acquired simultaneously which, after processing by the means 40, provide a profile formed of a set of points corresponding to intersection of the surface S and the plane YZ. All that is then required is to move the surface S, for example in translation along the axis X, to acquire a set of profiles constituting the surface S, which acquisition can be very fast. Alternatively, the movement of the surface S can be a rotation about the axis Y or an axis in the plane YZ. Knowing the position of the surface S relative to the device, it is possible by coordinate transformation to obtain the coordinates of points of each profile acquired in the same system of axes.

It is desirable, in a preliminary phase, to illuminate the surface S with a beam in which all the spectral components of the illumination are mixed (not dispersed). A simple way to do this is for the light beam generated by the source 42 not to pass through the dispersion means 48. In this case, the light backscattered by the surface S is captured and transmitted as described to the photodetectors 38, whose output signals provide reference signals stored in the information processing means 40 to render the measurements insensitive to variations of the spectral responses of the surface S (due to the color and to color variations of that surface) and long-term variations of the illumination means.

Calibration tables obtained by moving an object of known shape and storing the signals obtained at various points along the Y axis enable the distances of points on the surface of an object to be determined from wavelength and spectral width information provided by the photoreceptors 38.

In one embodiment of the invention the illumination means 30 include an arc lamp or a halogen lamp placed between a collecting mirror and a condenser and illuminating a diffraction grating 48, for example a flat field holographic spherical grating, via the entry slit 44.

The analysis mans 36 include the same type of diffraction grating, associated with CCD photoreceptors.

The objective 34 forms the image of the spectrum supplied by the means 36 and the white image of the grating 48 in the measurement space, those images having the same height and delimiting the measurement space. This embodiment measures profiles having a length of the order of 20 mm with a usable depth of field of the order of 30 mm. With a standard CCD camera, the profiles are sampled with a resolution of approximately 40 μm. The accuracy of the measured distance of each point is of the order of 1 μm.

Figure 7:
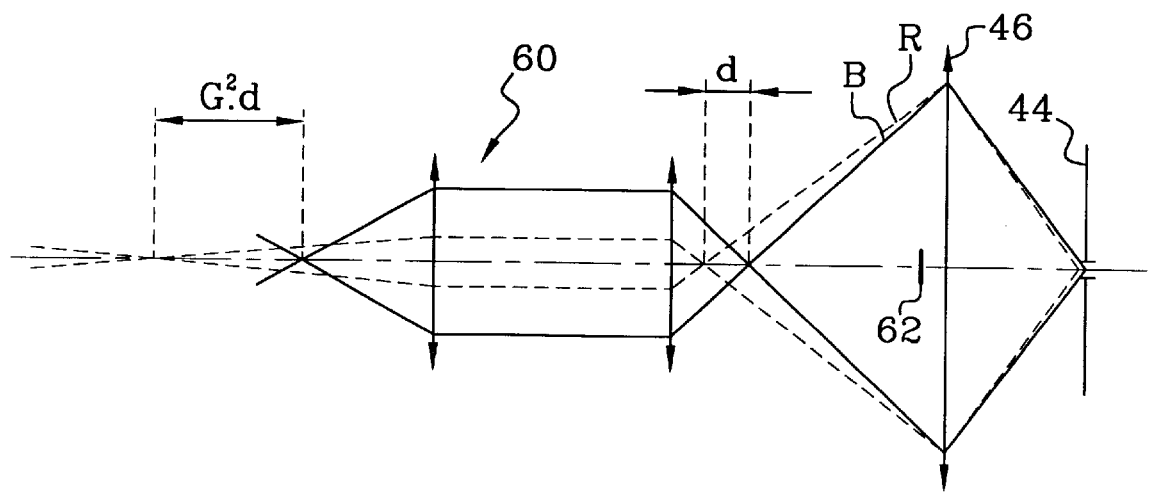
FIG. 7 is a diagram showing a different embodiment of the illumination means of the device shown in FIG. 6.

FIG. 7 shows a preferred embodiment of the illumination means of the device (for simplicity the mirror 52 and the semi-transparent plate 54 have been omitted). In this embodiment, the lens 46 is a chromatic optical system or lens whose focal length varies continuously with wavelength and the dispersive element 48 shown in FIG. 6 is dispensed with. The various wavelengths of the illumination light beam passing through the slit in the mask or diaphragm 44 are focussed at different points on the illumination axis, as shown diagrammatically in FIG. 7, the solid lines B representing the focussing of wavelengths corresponding to blue, the dashed lines R representing the focussing of wavelengths corresponding to red, and the distance d between the focussing points of the extreme illumination wavelengths corresponding to the usable depth of field.

To be effective, the chromatic optical system shown diagrammatically as a lens 46 must have a large aperture and retain good monochromatic imaging quality. In practice, this can limit the usable depth of field.

The invention then associates an optical system 60, for example an afocal optical system, of magnification G with the optical system 46, the effect of which is to multiply the depth of field by $G^2$ (G is equal to 4, for example). The lenses of the system 60 have small diameters, limited to the dimension of the area to be illuminated on the aforementioned surface S.

The afocal system 60 can be formed by the lens 50 and the objective 34 of the FIG. 6 embodiment.

If great spectral discrimination is required, a mask 62 can advantageously be placed on the optical axis after the lens 46, the mask being parallel to the illumination slit, for example. The mask 6 blocks central light rays, preventing excessive chromatic mixing in the illumination of the surface S.

In this preferred embodiment of the invention, and if the materials of the chromatic lens 46 and the dispersive element 58 of the analysis means 36 have the same spectral separation properties, all that is required is to know the center wavelength of the light backscattered by a point on the surface S to determine the position of that point relative to the reference plane and it is no longer necessary to measure the spectral width of that light (the aforementioned center wavelength being that for which the luminous intensity is a maximum). The output signals of the photodetectors 38 then enable that center wavelength to be determined directly.

Failing this, the analysis can be based on determining the center wavelength and the width of the backscattered light.

What is claimed is:

1. A device for opto-electrically acquiring the shape of the surface of an object comprising:

means for illuminating the surface by a plurality of light beams having different wavelengths, said light beams converging on an illumination axis at different points distributed along said illumination axis, respectively, whereby said light beams are reflected and backscattered by the surface;

(b) means arranged on said illumination axis for blocking central illuminating rays from passing on said illumination axis toward said surface;

(c) analyzing means for determining the spectral composition of captured light;

(d) optical means for capturing part of the light reflected and backscattered by the surface and for transmitting said captured light to said analyzing means; and (e) said analyzing means further including means for calculating from said spectral composition the distances between a reference plane and the points of the surface which reflect and backscatter light captured by said optical means.

2. A device as defined in claim 1, wherein said illuminating means includes:

(1) a polychromatic light source;

(2) means containing an aperture; and (3) a spectral dispersion element illuminated by said polychromatic light source via said aperture;

(f) said means for blocking said central illumination rays being arranged on said illumination axis after said spectral dispersion element.

3. A device as defined in claim 2, wherein said aperture is a slit.

4. A device according to claim 2, characterized in that said spectral dispersion element of said illumination means comprises a chromatic lens having a focal length that varies continuously with the wavelength of the light beam.

5. A device as defined in claim 1, wherein said optical means is arranged on said illumination axis.

6. A device according to claim 5, and further including an optical enlarging system (60) associated with said chromatic lens for increasing the usable depth of field between the extreme illumination wavelengths.

7. A device according to claim 1, wherein said illumination means (30) includes a plurality of light sources of small spectral width and having different center wavelengths.

8. A device according to claim 1, wherein said analyzing means includes a spectral dispersion element and a plurality of photosensitive sensors associated with said spectral dispersion element, said photosensitive sensors being arranged linearly or in a matrix arrangement.

9. A device according to claim 1, wherein said analyzing means (36) includes a triple linear strip of photodetectors for measuring and comparing light fluxes of three primary colors.

10. A device according to claim 1, wherein said illuminating means includes an objective for illuminating the surface with said beams, and for capturing the light reflected and backscattered by the surface, and a diaphragm associated with said objective, said diaphragm containing an aperture through which light passes to define an observation area of the surface; and further including control means for displacing said diaphragm relation to the surface.

* * * * *